United States Patent
Tanaka (10) Patent No.: US 11,777,119 B2
(45) Date of Patent: Oct. 3, 2023

(54) LEAK TEST METHOD FOR FUEL CELL STACK

(71) Applicant: HONDA MOTOR CO., LTD., Tokyo (JP)

(72) Inventor: Takahiro Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/587,067

(22) Filed: Jan. 28, 2022

(65) Prior Publication Data

US 2022/0255098 A1 Aug. 11, 2022

(30) Foreign Application Priority Data

Feb. 8, 2021 (JP) ................................ 2021-018045

(51) Int. Cl.
| | | |
|---|---|---|
| *H01M 8/04* | (2016.01) | |
| *H01M 8/04664* | (2016.01) | |
| *H01M 8/04089* | (2016.01) | |
| *H01M 8/2475* | (2016.01) | |
| *G01M 3/22* | (2006.01) | |
| *H01M 8/0432* | (2016.01) | |

(52) U.S. Cl.
CPC ....... *H01M 8/04679* (2013.01); *G01M 3/226* (2013.01); *H01M 8/04089* (2013.01); *H01M 8/04358* (2013.01); *H01M 8/2475* (2013.01)

(58) Field of Classification Search
CPC ......... H01M 8/04679; H01M 8/04089; H01M 8/04358; H01M 8/2475
See application file for complete search history.

(56) References Cited

U.S. PATENT DOCUMENTS

2014/0080029 A1* 3/2014 Hori ................... H01M 8/0204
429/465

FOREIGN PATENT DOCUMENTS

| JP | 2006-156038 A | 6/2006 |
|---|---|---|
| JP | 2010-049952 A | 3/2010 |

* cited by examiner

*Primary Examiner* — Olatunji A Godo
(74) *Attorney, Agent, or Firm* — Carrier, Shende & Associates P.C.; Joseph P. Carrier; Jeffrey T. Gedeon (57) ABSTRACT

In a tubular body mounting step, a tubular body is connected to a first end constituting member and a second end constituting member of a fuel cell stack, respectively. At this time, a first opening and a second opening formed at both ends of the tubular body are closed by the first end constituting member and the second end constituting member, respectively. Accordingly, the fuel cell stack is surrounded by the tubular body. A gap is formed between the outer wall of unit cells of the fuel cell stack and the inner wall of the tubular body. In a determination step, a test gas is supplied into the fuel cell stack. Further, whether the test gas exists in the gap is determined.

8 Claims, 5 Drawing Sheets

LEAK TEST METHOD FOR FUEL CELL STACK

CROSS-REFERENCE TO RELATED APPLICATIONS

This application is based upon and claims the benefit of priority from Japanese Patent Application No. 2021-018045 filed on Feb. 8, 2021, the contents of which are incorporated herein by reference.

BACKGROUND OF THE INVENTION

Field of the Invention

The present invention relates to a leak test method for a fuel cell stack for checking the presence or absence of a leak point in the fuel cell stack.

Description of the Related Art

A unit cell of a fuel cell stack is provided with a membrane electrode assembly (MEA) in which an electrolyte membrane is sandwiched between an anode and a cathode. In the unit cell, the MEA is sandwiched between a pair of separators. The fuel cell stack is formed by stacking a plurality of the unit cells. The fuel cell stack is operated when a fuel gas containing hydrogen is supplied to the anode and an oxygen-containing gas is supplied to the cathode. During the operation, a coolant such as water is supplied to the fuel cell stack.

If there is a leak point in the fuel cell stack, at least one of the fuel gas, the oxygen-containing gas, or the coolant leaks out from the inside of the fuel cell stack during the operation of the fuel cell stack. In order to avoid this, a leak test is performed before the fuel cell stack is actually used, as described in JP 2006-156038 A.

Conventionally, a leak test is carried out in a dedicated facility as described in JP 2010-049952 A. In this case, it is necessary to transport the fuel cell stack to the dedicated facility. Since the fuel cell stack is quite heavy, such transport is cumbersome and burdensome for an operator. From this point of view, JP 2010-049952 A proposes a configuration for carrying out a leak test at an installation site of the fuel cell stack.

SUMMARY OF THE INVENTION

In the technology disclosed in JP 2010-049952 A, a material that changes color in response to hydrogen gas is used. If the oxygen-containing gas or the coolant leaks out, the material does not change color. Therefore, it is impossible to detect leakage of the oxygen-containing gas or the coolant.

It is a main object of the present invention to provide a leak test method for a fuel cell stack which can easily determine whether there is a leak in the fuel cell stack.

According to an embodiment of the present invention, there is provided a leak test method for a fuel cell stack for checking whether there is a leak point in the fuel cell stack, the fuel cell stack comprising: a plurality of unit cells stacked together; and a first end constituting member and a second end constituting member located at ends in the stacking direction of the unit cells, the leak test method comprising: a tubular body mounting step of surrounding the unit cells with a tubular body including a first opening and a second opening at both ends thereof, wherein, by connecting the tubular body to the first end constituting member and the second end constituting member, the first opening and the second opening are closed respectively by the first end constituting member and the second end constituting member, the tubular body extends from the first end constituting member to the second end constituting member, and a gap is formed between outer walls of the unit cells and an inner wall of the tubular body; and a determination step of supplying a test gas to an inside of the fuel cell stack to determine whether the test gas exists in the gap.

According to the present invention, the fuel cell stack is directly covered with a tubular body. It is possible to determine whether there is a leak point in the fuel cell stack based on whether or not the test gas leaks from the fuel cell stack into the tubular body. Therefore, a large container for housing the fuel cell stack is unnecessary. There is also no need for a raising/lowering mechanism to pull down the fuel cell stack into the container or pull up the fuel cell stack out of the container. The leak test is also simplified.

For this reason, a leak test apparatus can be simplified and miniaturized. Further, since a dedicated facility such as a container or a raising/lowering mechanism is not required, a leak test can be performed at or near the installation site of the fuel cell stack. Therefore, it is not necessary to transport the fuel cell stack to the leak test apparatus. Therefore, the work is simplified and the time required for the leak test is shortened. As a result, the burden on the operator is reduced.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a schematic flow of the leak test method according to the second embodiment;

FIG. 7 is a schematic side sectional view schematically showing a state in which the fuel cell stack is incorporated in a submersion test apparatus different from that shown in FIG. 5;

FIG. 8 is a schematic perspective exploded view of a tubular body formed of a plurality of members; and FIG. 9 is a schematic perspective exploded view of a tubular body formed of a plurality of members and different from the tubular body shown in FIG. 8.

DESCRIPTION OF THE INVENTION

Hereinafter, preferred embodiments of a leak test method for a fuel cell stack according to the present invention will be described in detail with reference to the accompanying drawings.

Figure 1:
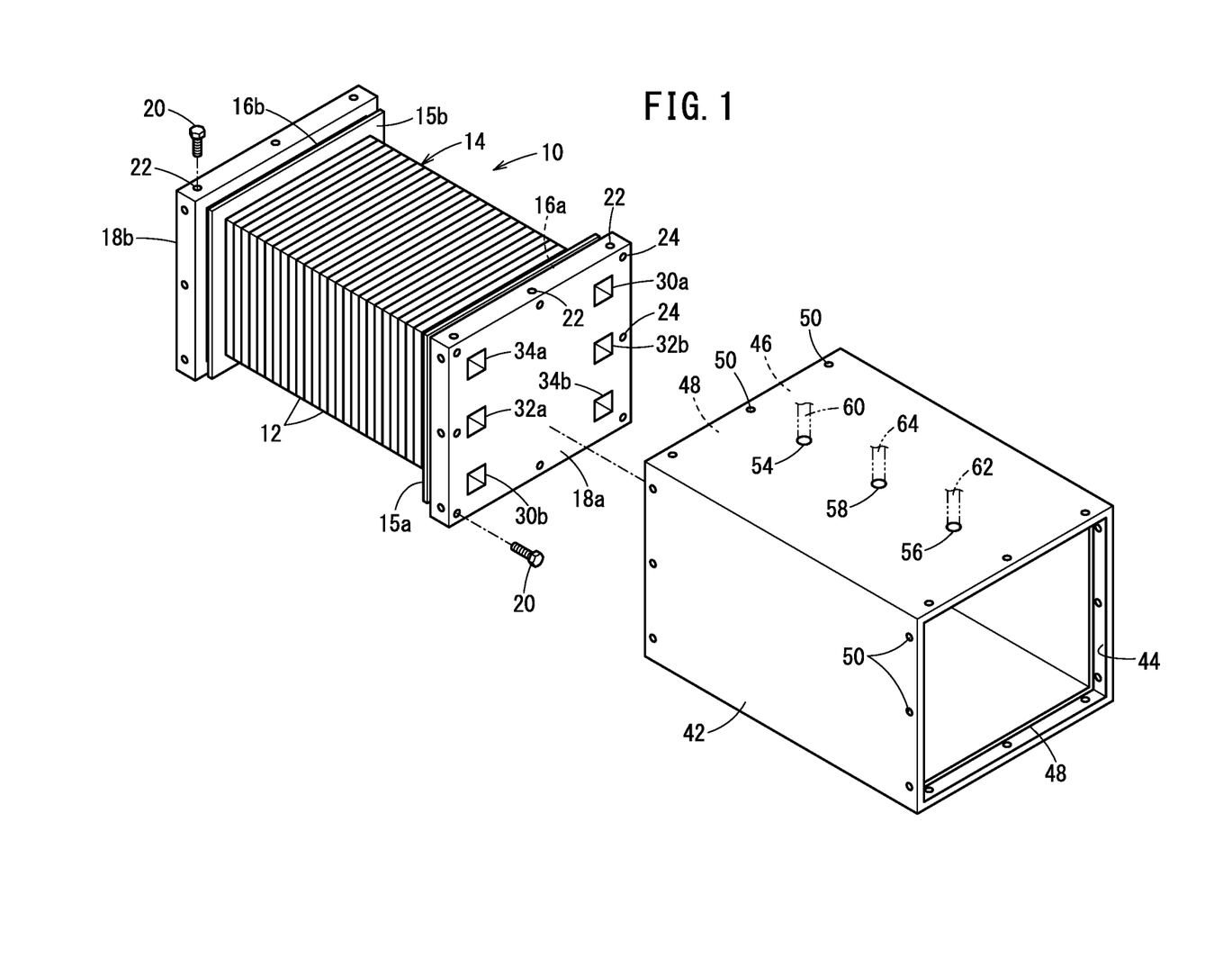
FIG. 1 is a schematic perspective view showing a fuel cell stack, and a tubular body surrounding the fuel cell stack.

First, referring to FIG. 1, a fuel cell stack 10 will be schematically described. The fuel cell stack 10 includes a cell stacked body 14 in which a plurality of unit cells 12 are stacked. The unit cell 12 is provided with a membrane electrode assembly (MEA) in which an electrolyte membrane is sandwiched between an anode and a cathode. The unit cell 12 includes a pair of separators sandwiching the MEA. A resin frame member may be provided on the outer periphery of the MEA. A fuel gas flow field is formed in one of the pair of separators. An oxygen-containing gas flow field is formed in the other of the pair of separators. In the adjacent unit cells 12, the separators overlap each other. A coolant flow field is formed between the overlapping separators. Since the above configuration is well known, detailed description and illustration thereof are omitted.

The cell stacked body 14 is sandwiched between a pair of terminal plates 15a and 15b. Insulating plates 16a and 16b made of an insulating material are disposed outside the terminal plates 15a and 15b, respectively. A first end plate 18a and a second end plate 18b are disposed outside the insulating plates 16a and 16b, respectively. That is, the terminal plates 15a and 15b, the insulating plates 16a and 16b, and the end plates 18a and 18b are provided at both ends of the unit cell 12 in the stacking direction. The terminal plates 15a and 15b, the insulating plates 16a and 16b, and the end plates 18a and 18b are arranged in this order from the inside to the outside of the cell stacked body 14. In the first and second embodiments described later, the first end plate 18a and the second end plate 18b are located at both ends of the fuel cell stack 10, respectively. In the first and second embodiments, the first end plate 18a corresponds to a first end constituting member, and the second end plate 18b corresponds to a second end constituting member.

The outer dimensions (height and depth) of the first end plate 18a and the second end plate 18b are larger than the outer dimensions (height and depth) of the separators. Therefore, as shown in FIG. 1, the outer edge end surfaces of the first end plate 18a and the second end plate 18b protrude more outward than the outer edge end surfaces of the unit cell 12. A plurality of screw holes 22 are formed in the outer edge end surfaces of the first end plate 18a and the second end plate 18b. For example, a member such as a protective panel is connected to the screw holes 22 through connecting screws 20. FIG. 1 also shows screw holes 24 formed in the end surface of the first end plate 18a in the stacking direction. The protective panel or the like is also connected to the screw holes 24. However, for convenience of explanation, different reference numerals are given to the screw holes 22 and the screw holes 24.

At the left end of the first end plate 18a in FIG. 1, a fuel gas discharge passage 30b, a coolant supply passage 32a, and an oxygen-containing gas supply passage 34a are formed along the up-down direction. At the right end of the first end plate 18a in FIG. 1, an oxygen-containing gas discharge passage 34b, a coolant discharge passage 32b, and a fuel gas supply passage 30a are formed along the up-down direction. The six passages 30a, 30b, 32a, 32b, 34a and 34b extend in parallel to each other in the stacking direction of the unit cells 12 within the cell stacked body 14.

Figure 3:
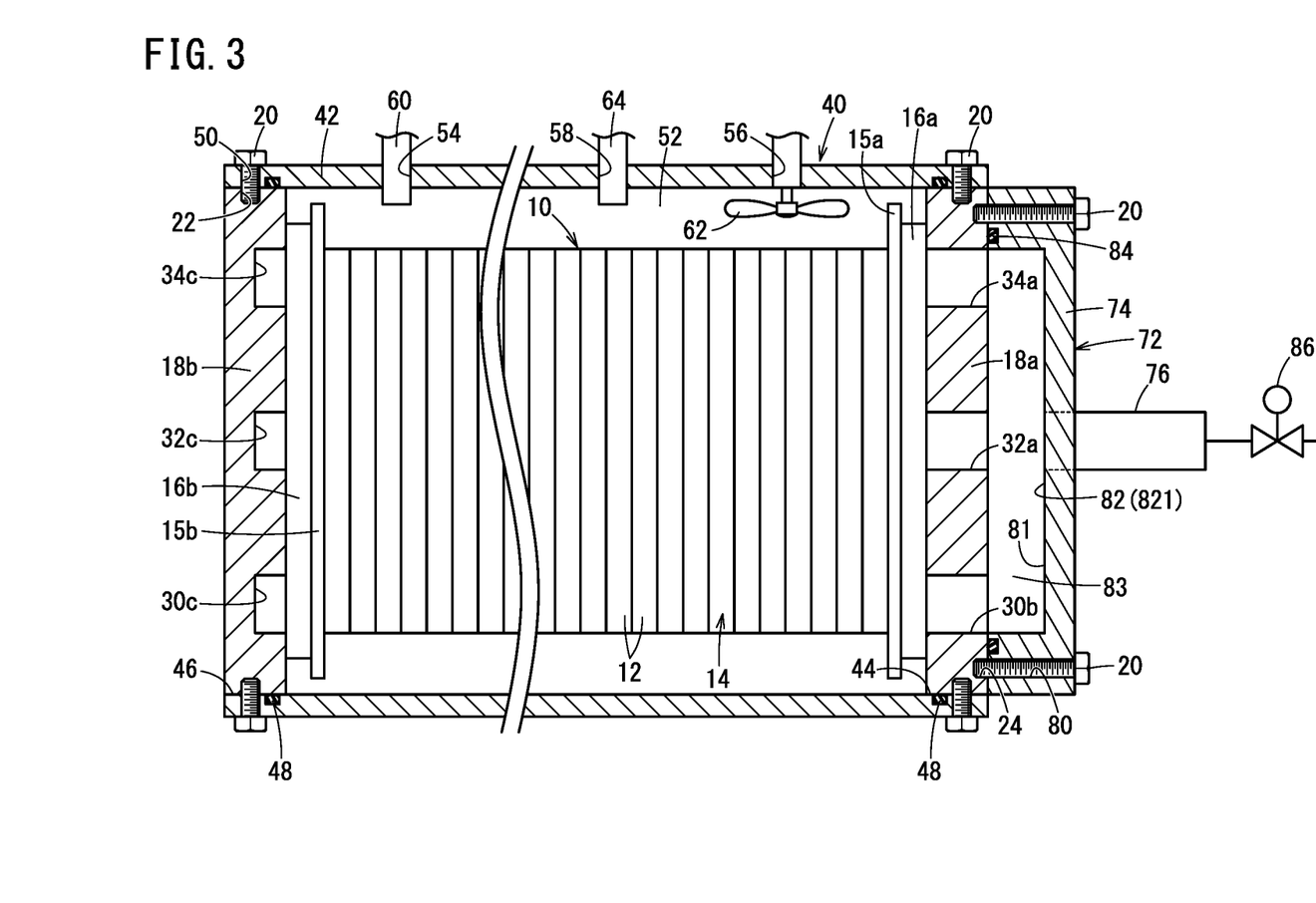
FIG. 3 is a schematic side sectional view taken along a longitudinal direction of the fuel cell stack when the fuel cell stack is surrounded by the tubular body.

The second end plate 18b has formed therein a fuel gas communication channel 30c, an oxygen-containing gas communication channel 34c, and a coolant communication channel 32c (see FIG. 3). The fuel gas communication channel 30c allows communication between the fuel gas supply passage 30a and the fuel gas discharge passage 30b. The oxygen-containing gas communication channel 34c allows communication between the oxygen-containing gas supply passage 34a and the oxygen-containing gas discharge passage 34b. The coolant communication channel 32c allows communication between the coolant supply passage 32a and the coolant discharge passage 32b. The communication channels 30c, 32c, 34c are provided as grooves in the second end plate 18b.

The fuel gas supply passage 30a and the fuel gas discharge passage 30b communicate with the fuel gas flow field formed in each separator. The oxygen-containing gas supply passage 34a and the oxygen-containing gas discharge passage 34b communicate with the oxygen-containing gas flow field formed in each separator. The coolant supply passage 32a and the coolant discharge passage 32b communicate with the coolant flow field formed between the separators.

Figure 2:
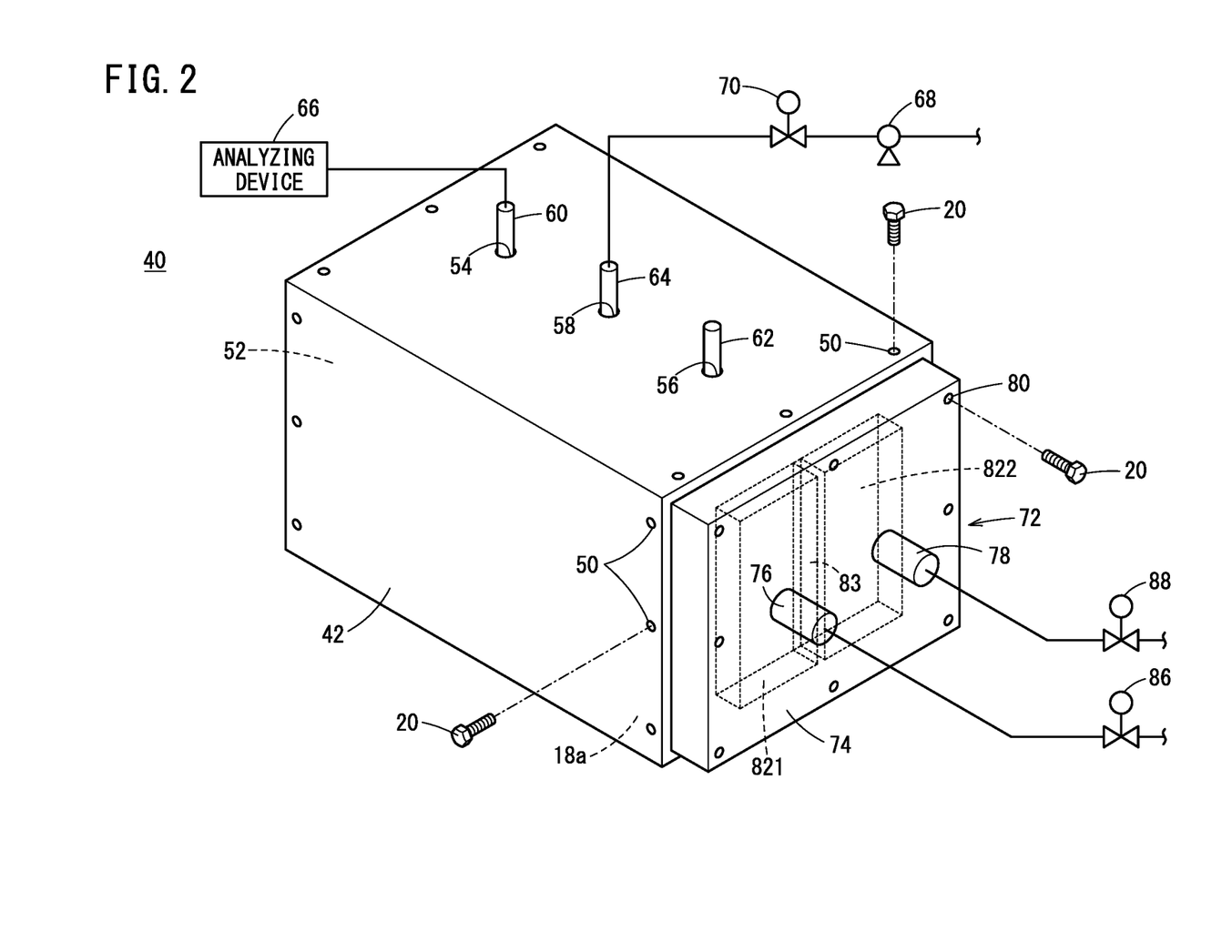
FIG. 2 is a main part schematic perspective view schematically showing a state in which the fuel cell stack is incorporated in an airtight test apparatus for carrying out a leak test method according to a first embodiment of the present invention.

The leak test method according to the first embodiment is carried out using an airtight test apparatus 40 shown in FIGS. 2 and 3. Next, the airtight test apparatus 40 will be described.

The airtight test apparatus 40 includes a first tubular body 42 surrounding the fuel cell stack 10. The first tubular body 42 is a container for carrying out an airtight test. Suitable examples of the material of the first tubular body 42 include a resin material such as an acrylic resin or a metal material such as an aluminum alloy. Preferably, the first tubular body 42 is formed of a single member. In this case, the occurrence of leakage from the first tubular body 42 is avoided.

The first tubular body 42 has a substantially rectangular cross-section orthogonal to the longitudinal direction thereof. The first tubular body 42 is a hollow body. A first opening 44 is formed at one end of the first tubular body 42 in the longitudinal direction. A second opening 46 is formed at the other end of the first tubular body 42 in the longitudinal direction. The opening dimensions (height and depth) of the first opening 44 and the second opening 46 correspond to the outer dimensions of the first end plate 18a and the second end plate 18b. Seal members 48 are individually provided on the inner walls of the first opening 44 and the second opening 46. The seal member 48 seals between the first tubular body 42 and the first end plate 18a (or the second end plate 18b). A typical example of the seal member 48 is an O-ring or the like. The seal member 48 may be a sheet-shaped gasket.

Alternatively, a flange may be provided at one end of the first tubular body 42. In this case, the flange may be screwed to one of the first end plate 18a or the second end plate 18b, at a position adjacent to the cell stacked body 14.

At the end portion of the first tubular body 42 in the longitudinal direction, a plurality of screw insertion holes 50 are formed so as to surround the first opening 44 or the second opening 46. The positions of the screw insertion holes 50 correspond to the positions of the screw holes 22 formed in the outer edge end surface of the first end plate 18a or the second end plate 18b. The first tubular body 42 and the first end plate 18a are connected to each other by screwing the connecting screws 20 passed through the screw insertion holes 50, into the screw holes 22. Similarly, the first tubular body 42 and the second end plate 18b are connected to each other by screwing the connecting screws 20 passed through the screw insertion holes 50, into the screw holes 22. With this connection, as shown in FIGS. 2 and 3, the first opening 44 and the second opening 46 are closed by the first end plate 18a and the second end plate 18b, respectively. Further, the cell stacked body 14 of the fuel cell stack 10 is surrounded by the first tubular body 42.

FIG. 3 shows a state in which the first end plate 18a and the second end plate 18b are connected to the first tubular body 42. As described above, the outer edge end surfaces of the first end plate 18a and the second end plate 18b protrude from the outer edge end surfaces of the cell stacked body 14. Therefore, a space (gap 52) is formed between the outer wall of the cell stacked body 14 and the inner wall of the first tubular body 42.

A ceiling wall, which is the uppermost portion of the first tubular body 42, includes a first insertion hole 54, a second insertion hole 56, and a third insertion hole 58 that penetrate through the ceiling wall. In the illustrated example, a gas sensor 60 is fitted into the first insertion hole 54. A fan 62 (diffusion device) for diffusion is fitted into the second insertion hole 56. An exhaust pipe 64 is provided in the third insertion hole 58. A seal member (not shown) is interposed between the inner wall of the first insertion hole 54 and the gas sensor 60. Similarly, a seal member (not shown) is interposed between the inner wall of the second insertion hole 56 and the fan 62. A seal member (not shown) is also interposed between the inner wall of the third insertion hole 58 and the exhaust pipe 64.

The gas sensor 60 and the exhaust pipe 64 may be provided in the same insertion hole. The exhaust pipe 64 may be provided with the gas sensor 60. The diameter of the second insertion hole 56 is preferably such a size as to allow the fan 62 to be inserted therein. Alternatively, after the fan 62 is passed through the second insertion hole 56, the second insertion hole 56 may be filled with a filling material such as putty. The filling material is preferably removable from the second insertion hole 56. When the leak test is performed under a vacuum, it is not particularly necessary to provide the fan 62.

The result of detection by the gas sensor 60 is displayed on an analyzing device 66 such as a personal computer. A vacuum pump 68 is connected to the exhaust pipe 64. The exhaust pipe 64 is provided with a valve 70 for stopping the exhaust.

The airtight test apparatus 40 further includes a panel 72 in addition to the gas sensor 60, the analyzing device 66, the fan 62, and the vacuum pump 68. The panel 72 is a member for supplying or exhausting the test gas. The panel 72 is attached to the first end plate 18a.

The panel 72 is a single member. The panel 72 integrally includes a cover plate portion 74, a test gas supply pipe 76, and a test gas discharge pipe 78. The test gas supply pipe 76 and the test gas discharge pipe 78 are connected to the cover plate portion 74. Screw insertion holes 80 are formed in the cover plate portion 74. The positions of the screw insertion holes 80 correspond to the positions of the screw holes 24 formed in the first end plate 18a. The panel 72 and the first end plate 18a are connected to each other through the connecting screws 20. That is, the connecting screws 20 are passed through the screw insertion holes 80 and connected to the screw holes 24. Instead of screwing, the panel 72 may be positioned by pressing the cover plate portion 74 toward the cell stacked body 14 by a pressing device or the like.

The cover plate portion 74 has a shape in which a portion facing the first end plate 18a is hollowed out into a quadrangular prism shape. Therefore, the cover plate portion 74 has an outer peripheral portion, and a step portion 81 surrounded by the outer peripheral portion. The step portion 81 is a recessed portion recessed so as to be away from the first end plate 18a. The test gas supply pipe 76 and the test gas discharge pipe 78 are opened at the step portion 81. Further, an inner chamber 82 is formed between the cover plate portion 74 and the first end plate 18a by the step portion 81. A seal member 84 prevents the test gas from leaking from the inner chamber 82 to the outside of the first tubular body 42.

The cover plate portion 74 covers the six passages 30a, 30b, 32a, 32b, 34a, 34b formed in the first end plate 18a. However, as can be understood from the above, the end surface of the cover plate portion 74 (the bottom surface of the recessed step portion 81) that faces the first end plate 18a and the six passages 30a, 30b, 32a, 32b, 34a, 34b are separated from each other by the step of the step portion 81.

The inner chamber 82 of the cover plate portion 74 is divided (partitioned) into two parts by a partition wall portion 83. Accordingly, the inner chamber 82 has a first space 821 and a second space 822. The test gas supply pipe 76 communicates with the fuel gas discharge passage 30b, the oxygen-containing gas supply passage 34a, and the coolant supply passage 32a via the first space 821 of the inner chamber 82. The test gas discharge pipe 78 communicates with the fuel gas supply passage 30a, the oxygen-containing gas discharge passage 34b, and the coolant discharge passage 32b via the second space 822 of the inner chamber 82.

One end of the test gas supply pipe 76 is connected to a test gas supply source (for example, a helium gas cylinder) via a pipe joint and a supply line (not shown). On the other hand, the other end of the test gas discharge pipe 78 is open to the atmosphere. Alternatively, the other end of the test gas discharge pipe 78 is connected to a test gas recovery device via a pipe joint and a recovery line (not shown). When the test gas discharge pipe 78 is connected to the test gas recovery device, it is also possible to circulate and supply the test gas from the test gas recovery device. A first on-off valve 86 is provided in the test gas supply pipe 76. A second on-off valve 88 is provided in the test gas discharge pipe 78.

In the above-described configuration, the test gas is supplied simultaneously from the test gas supply pipe 76 to the fuel gas discharge passage 30b, the oxygen-containing gas supply passage 34a, and the coolant supply passage 32a. The test gas is discharged simultaneously from the fuel gas supply passage 30a, the oxygen-containing gas discharge passage 34b, and the coolant discharge passage 32b to the test gas discharge pipe 78.

Alternatively, three branch supply pipes branched from the test gas supply pipe 76 may be respectively connected to the fuel gas supply passage 30a (or the fuel gas discharge passage 30b), the oxygen-containing gas supply passage 34a, and the coolant supply passage 32a. Similarly, branch discharge pipes may be respectively connected to the fuel gas discharge passage 30b (or the fuel gas supply passage 30a), the oxygen-containing gas discharge passage 34b, and the coolant discharge passage 32b, and the branch discharge pipes may be collectively connected to the test gas discharge pipe 78. In this case, an on-off valve may be provided in each of the branch supply pipes and each of the branch discharge pipes. According to this configuration, for example, it is possible to check whether there is a leak in a path from the fuel gas supply passage 30a to the fuel gas discharge passage 30b. Similarly, it is possible to individually check whether there is a leak in a path from the oxygen-containing gas supply passage 34a to the oxygen-containing gas discharge passage 34b or in a path from the coolant supply passage 32a to the coolant discharge passage 32b. It is noted that the above-described configuration is not shown.

Figure 4:
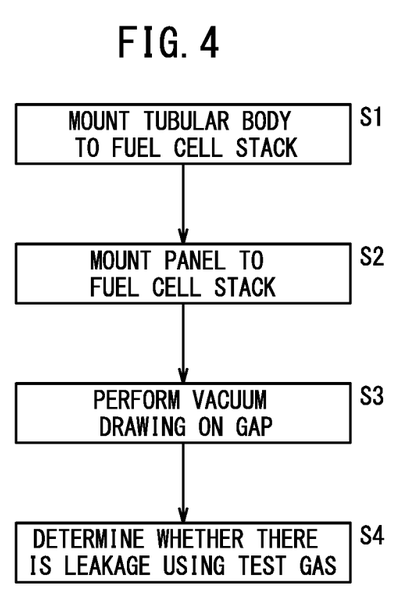
FIG. 4 is a schematic flow of the leak test method according to the first embodiment.

Next, the leak test method (airtight test) according to the first embodiment will be described also with reference to the schematic flow shown in FIG. 4. In the following description, a case where a leak test is performed under vacuum by performing vacuum drawing is exemplified. However, in the case of simply executing the leak test, it is also possible to perform the leak test under atmospheric pressure by omitting the vacuum drawing. In this case, it is not particularly necessary to provide the fan 62.

The leak test method according to the first embodiment includes a tubular body mounting step S1, a panel connecting step S2, a vacuum drawing step S3, and a determination step S4. It should be noted that the tubular body mounting step S1 and the panel connecting step S2 are performed in random order, and any of them may be performed first. Here, a case where the tubular body mounting step S1 is performed first will be exemplified.

First, in the tubular body mounting step S1, the fuel cell stack 10 is surrounded by the first tubular body 42. That is, the fuel cell stack 10 is passed through the first opening 44 or the second opening 46 of the first tubular body 42. At this time, the position of the first end plate 18a is made to correspond to the position of the first opening 44, and the position of the second end plate 18b is made to correspond to the position of the second opening 46. Accordingly, the screw insertion holes 50 formed in the first tubular body 42 overlap the screw holes 22 formed in the first end plate 18a and the second end plate 18b. Then, the operator passes the connecting screws 20 through the screw insertion holes 50, and screws the connecting screws 20 into the screw holes 22. The seal members 48 are provided in advance on the inner walls of the first opening 44 and the second opening 46.

By the above-described screwing, the first end plate 18a is connected to the first tubular body 42 and closes the first opening 44. Similarly, the second end plate 18b is connected to the first tubular body 42 and closes the second opening 46. As a result, the fuel cell stack 10 is surrounded by the first tubular body 42. The gap 52 is formed between the outer wall of the cell stacked body 14 and the inner wall of the first tubular body 42.

Next, in the panel connecting step S2, the panel 72 is connected to the first end plate 18a. That is, the connecting screws 20 are passed through the screw insertion holes 80 formed in the cover plate portion 74 of the panel 72. Thereafter, the connecting screws 20 are screwed into the screw holes 24 formed in the first end plate 18a. The seal member 84 is provided in the panel 72 in advance.

As a result of the panel connecting step S2, the fuel gas supply passage 30a, the fuel gas discharge passage 30b, the oxygen-containing gas supply passage 34a, the oxygen-containing gas discharge passage 34b, the coolant supply passage 32a, and the coolant discharge passage 32b are covered with the cover plate portion 74. Further, the inner chamber 82 is formed by the cover plate portion 74 and the first end plate 18a.

Thereafter, the gas sensor 60, the fan 62, and the exhaust pipe 64 are mounted to the first tubular body 42. The gas sensor 60, the fan 62, and the exhaust pipe 64 may be mounted to the first tubular body 42 prior to the tubular body mounting step S1. In either case, seal members are interposed between the inner wall of the first insertion hole 54 and the gas sensor 60, between the inner wall of the second insertion hole 56 and the fan 62, and between the inner wall of the third insertion hole 58 and the exhaust pipe 64.

Then, after the first on-off valve 86 and the second on-off valve 88 are closed, the vacuum drawing step S3 is performed. That is, the vacuum pump 68 is energized and the exhaust stop valve 70 is opened. As a result, gas (atmospheric air) existing in the gap 52 between the outer wall of the cell stacked body 14 and the inner wall of the first tubular body 42 is drawn into the vacuum pump 68. That is, the gap 52 is vacuumed. When a leak point exists in the fuel cell stack 10, the gas existing inside the fuel cell stack 10 is also exhausted at the same time.

Then, the exhaust stop valve 70 is closed and the fan 62 is energized. In this state, the determination step S4 is performed using the test gas (for example, helium gas). Specifically, the first on-off valve 86 is opened and the second on-off valve 88 is opened. As a result, the test gas flows into the fuel cell stack 10 through the test gas supply pipe 76 and the inner chamber 82 (first space 821) from the fuel gas discharge passage 30b, the oxygen-containing gas supply passage 34a, and the coolant supply passage 32a.

A portion of the test gas flows through the fuel gas flow field and the oxygen-containing gas flow field formed in the separator, respectively. Another portion of the test gas flows through the coolant flow field formed between the adjacent separators. The test gas is discharged to the test gas discharge pipe 78 from the fuel gas supply passage 30a, the oxygen-containing gas discharge passage 34b, and the coolant discharge passage 32b through the second space 822. Thus, the test gas flows into the fuel cell stack 10. As a result, the gas in the fuel cell stack 10 is replaced by the test gas.

After a predetermined time has elapsed from the start of introduction (circulation) of the test gas, the second on-off valve 88 is switched to a closed state. Since the first on-off valve 86 is maintained in an open state, the pressure of the test gas in the fuel cell stack 10 increases. Thereafter, when the first on-off valve 86 is switched to a closed state, the test gas is sealed in the fuel cell stack 10 at a predetermined pressure.

When there is no leak point in the fuel cell stack 10, the test gas hardly leaks from the inside of the fuel cell stack 10 toward the outside. Therefore, the concentration of the test gas in the gap 52 does not rise to a predetermined threshold or more in a short time. In this case, no warning is displayed on the analyzing device 66. Therefore, the operator can determine that "there is no leak point in the fuel cell stack 10".

On the other hand, when there is a leak point in the fuel cell stack 10, the test gas leaks from the fuel cell stack 10 into the gap 52. The leak point may be, for example, a seal between the MEA and the separator. Alternatively, seals on the outer peripheries of the passages 30a, 30b, 32a, 32b, 34a, 34b can be considered as leak points. Here, a case where the test gas is helium gas will be described. Helium gas consists of single atoms. Therefore, the atomic radius of helium is small and the test gas leaks out in a relatively short time. Accordingly, it is possible to quickly and accurately recognize that leakage has occurred. It is noted that the test gas is not particularly limited to helium gas. Other suitable specific examples of the test gas include hydrogen gas, methane gas, nitrogen gas, and the like.

When a leak test is performed under vacuum, the fan 62 is rotating inside the gap 52. Therefore, even if the test gas is light helium gas, the test gas easily moves toward the gas sensor 60 from the leak point. Further, since the gap 52 is vacuumed in advance to exhaust a gas other than the test gas, erroneous detection caused by a gas other than the test gas can be avoided. Therefore, the gas sensor 60 can detect the test gas in a short time with high accuracy. Further, the concentration of the test gas in the gap 52 is quickly determined by the analyzing device 66.

In this case, a warning is displayed on the analyzing device 66. If necessary, a warning sound is generated. As a result, the operator can determine that "there is a leak point in the fuel cell stack 10".

Thus, according to the first embodiment, the leak test can be performed on the spot without transporting the fuel cell stack 10 to the dedicated facility. Further, a container having a size capable of surrounding the fuel cell stack 10 can be used as the first tubular body 42. Therefore, it is possible to prevent the airtight test apparatus 40 from becoming large in size.

Further, when the first tubular body 42 is connected to the fuel cell stack 10, the screw holes 22 and 24 formed in the first end plate 18a and the second end plate 18b are utilized. After the first tubular body 42 is removed from the fuel cell stack 10, a predetermined member such as a protective panel is connected to the screw holes 22 and 24. That is, the first tubular body 42 is connected to the fuel cell stack 10 through the screw holes 22 and 24 formed for mounting the predetermined member. Therefore, it is not necessary to separately provide a connecting portion for connecting the first tubular body 42 to the fuel cell stack 10. Therefore, the shape or configuration of the fuel cell stack 10 can be prevented from becoming complicated.

The leakage can be recognized not only when the leakage occurs in a hydrogen gas flow path (the fuel gas supply passage 30a, the fuel gas flow field, and the fuel gas discharge passage 30b). The leakage can be recognized also when the leakage occurs in an oxygen-containing gas flow path (the oxygen-containing gas supply passage 34a, the oxygen-containing gas flow field, and the oxygen-containing gas discharge passage 34b), or a coolant flow path (the coolant supply passage 32a, the coolant flow field, and the coolant discharge passage 32b). That is, in this case, the presence of the leak point can be perceived regardless of the position of the leak point.

After the leak test is performed as described above, the second on-off valve 88 is opened. Thus, the test gas is discharged into the atmosphere, or the test gas is recovered by the test gas recovery device. The recovered test gas can be supplied to the fuel cell stack 10 when the next leak test is performed.

The fuel cell stack 10 determined to "have a leak point" is subjected to a process such as further tightening a tie rod (not shown) for connecting the first end plate 18a and the second end plate 18b. Alternatively, the cell stacked body 14 may be disassembled once, and a unit cell in which leakage occurs may be replaced by a new unit cell. Thus, repair is performed for the leak point.

Figure 5:
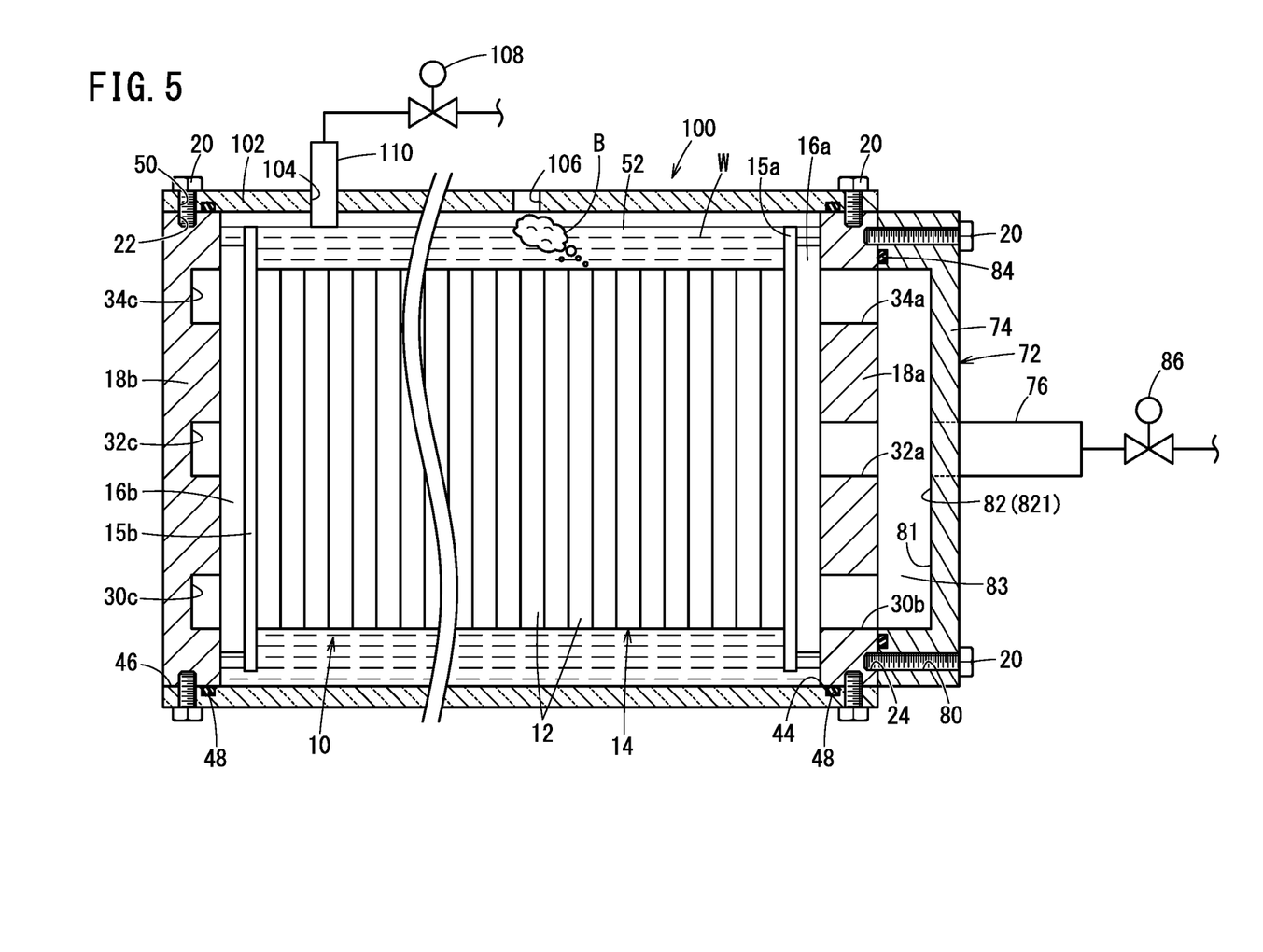
FIG. 5 is a schematic side sectional view schematically showing a state in which the fuel cell stack is incorporated in a submersion test apparatus for carrying out a leak test method according to a second embodiment of the present invention.

Next, a leak test method according to the second embodiment will be described by exemplifying a case where water is used as a test liquid. In this case, a submersion test using a submersion test apparatus 100 shown in FIG. 5 is performed. For ease of understanding, components corresponding to the components of the first tubular body 42 are denoted by the same reference numerals.

The submersion test apparatus 100 is provided with a second tubular body 102 surrounding the fuel cell stack 10. The second tubular body 102 is a container for carrying out a submersion test. An example of the material of the second tubular body 102 is a metal material such as an aluminum alloy. However, it is preferable that the material of the second tubular body 102 is a resin material such as an acrylic resin and is transparent as in the illustrated example. The second tubular body 102 may be formed of a single member. As described later, a plurality of members may be combined to form the second tubular body 102 (see FIGS. 8 and 9). A plurality of plate members may be joined together to form the second tubular body 102.

A case where the second tubular body 102 is formed of a single member is exemplified. In this case, the shape of the second tubular body 102 is substantially the same as the shape of the first tubular body 42. That is, the second tubular body 102 is a hollow body having a substantially rectangular cross-section orthogonal to the longitudinal direction thereof. A first opening 44 having an opening size corresponding to the outer dimension of the first end plate 18a is formed at one end portion of the second tubular body 102 in the longitudinal direction. A second opening 46 having an opening size corresponding to the outer dimension of the second end plate 18b is formed at the other end portion of the second tubular body 102 in the longitudinal direction. Similarly to the first embodiment, the inner walls of the first opening 44 and the second opening 46 and the outer edge end surfaces of the first end plate 18a and the second end plate 18b are respectively sealed by the seal members 48. Further, a plurality of screw insertion holes 50 are formed at end portions of the second tubular body 102 in the longitudinal direction, at positions surrounding the first opening 44 and the second opening 46.

A ceiling wall, which is the uppermost portion of the second tubular body 102, includes a pipe insertion hole 104 and an opening 106 for venting gas that penetrate through the ceiling wall. A water supply pipe 110 provided with a third on-off valve 108 is passed through the pipe insertion hole 104. A water supply source (not shown) is connected to the water supply pipe 110. It is not particularly necessary to interpose a seal material between the inner wall of the pipe insertion hole 104 and the water supply pipe 110.

The submersion test apparatus 100 further includes a panel 72 attached to the first end plate 18a. The panel 72 is the same as the panel 72 constituting the airtight test apparatus 40. Accordingly, components corresponding to the components of the first embodiment are denoted by the same reference numerals, and detailed description thereof will be omitted.

Next, a leak test method (submersion test) according to the second embodiment will be described also with reference to the schematic flow shown in FIG. 6. The leak test method according to the second embodiment includes a tubular body mounting step S11, a panel connecting step S12, a water introduction step S13, and a determination step S14. It should be noted that the tubular body mounting step S11 and the panel connecting step S12 are performed in random order, and any of them may be performed first. Here, a case where the tubular body mounting step S11 is performed first will be exemplified.

In the tubular body mounting step S11, the same operation as that in the tubular body mounting step S1 is performed, and the fuel cell stack 10 is surrounded by the second tubular body 102. That is, the fuel cell stack 10 is passed through the first opening 44 or the second opening 46 of the second tubular body 102, and the positions of the first end plate 18a and the second end plate 18b are made to correspond to the positions of the first opening 44 and the second opening 46, respectively. At this time, the screw insertion holes 50 formed in the second tubular body 102 overlap the screw holes 22 formed in the first end plate 18a and the second end plate 18b. Then, the operator passes the connecting screws 20 through the screw insertion holes 50, and further, screws the connecting screws 20 into the screw holes 22. The seal members 48 are provided in advance on the inner walls of the first opening 44 and the second opening 46.

By the above-described screwing, the first end plate 18a and the second end plate 18b are connected to the second tubular body 102. The first end plate 18a closes the first opening 44, and the second end plate 18b closes the second opening 46. As a result, the fuel cell stack 10 is surrounded by the second tubular body 102. Further, a gap 52 is formed between the outer wall of the cell stacked body 14 and the inner wall of the second tubular body 102.

Next, in the panel connecting step S12, the panel 72 is connected to the first end plate 18a. That is, the connecting screws 20 are passed through the screw insertion holes 80 formed in the panel 72, and are screwed into the screw holes 24 formed in the first end plate 18a. By the panel connecting step S12, the fuel gas supply passage 30a, the fuel gas discharge passage 30b, the oxygen-containing gas supply passage 34a, the oxygen-containing gas discharge passage 34b, the coolant supply passage 32a, and the coolant discharge passage 32b are covered with the panel 72. Further, an inner chamber 82 is formed by the first end plate 18a and the panel 72.

Thereafter, the water supply pipe 110 is inserted into the pipe insertion hole 104. The water supply pipe 110 may be mounted to the second tubular body 102 prior to the tubular body mounting step S11.

Next, a water introduction step S13 is performed. Specifically, by opening the third on-off valve 108, water W is introduced into the second tubular body 102 from the water supply source through the water supply pipe 110. By the water W being stored in the gap 52, the water level rises in the second tubular body 102. As a result, the water surface rises above the upper outer wall of the cell stacked body 14, and the cell stacked body 14 is submerged. Further, a space remains only between the water surface and the ceiling wall of the second tubular body 102. That is, in this case, the gap 52 as a space remains only between the upper outer wall of the cell stacked body 14 (unit cells 12) and the ceiling wall (uppermost portion) of the second tubular body 102. While the water level rises, gas (atmospheric air) existing in the gap 52 is discharged to the outside of the second tubular body 102 through the opening 106.

When the second tubular body 102 is transparent, it is easy for the operator to visually confirm the water level. When the water level rises to a predetermined level in the second tubular body 102, the operator closes the third on-off valve 108 to stop the supply of the water W. Alternatively, the third on-off valve 108 may be automatically closed. In this case, a water level sensor and a control device such as a personal computer are provided. The water level sensor detects that the water level has reached the predetermined level in the second tubular body 102. At this time, the control device performs control to close the third on-off valve 108.

Next, the test gas is supplied to the inside of the fuel cell stack 10 in the same manner as in the first embodiment, and the determination step S14 is performed. In the second embodiment, it is not particularly necessary to seal the test gas in the fuel cell stack 10. For example, the test may be carried out in a state in which both the first on-off valve 86 and the second on-off valve 88 are opened and the test gas flows through the fuel cell stack 10. In the second embodiment, compressed air, compressed nitrogen, or the like can be used as the test gas.

When the second tubular body 102 is transparent, it is easy for the operator to visually check whether or not bubbles B are generated. That is, when there is no leak point in the fuel cell stack 10, the test gas hardly leaks from the inside of the fuel cell stack 10 and is discharged to the water W. Therefore, the bubbles B are hardly observed in the water W. As can be understood from this, the operator can determine that "there is no leak point in the fuel cell stack 10" when the bubbles B are not visually observed. Alternatively, it may be determined that "there is no leak point in the fuel cell stack 10" when the test gas having a predetermined concentration or higher does not exist in the gap 52 formed between the upper outer wall of the cell stacked body 14 and the ceiling wall of the second tubular body 102.

On the other hand, when there is a leak point in the fuel cell stack 10, the test gas leaks from the leak point. Here, the passages 30a, 30b, 32a, 32b, 34a, 34b are covered with the panel 72. Therefore, the gas in the fuel cell stack 10 leaks from the leak point without being discharged from the passages 30a, 30b, 32a, 32b, 34a, 34b. As a result, as shown in FIG. 5, bubbles B are generated in the water W. The operator can determine that "there is a leak point in the fuel cell stack 10" when the bubbles B are visually recognized.

As described above, also in the second embodiment, it is possible to perform a leak test on the spot without transporting the fuel cell stack 10 to the dedicated facility. Further, a container having a size capable of surrounding the fuel cell stack 10 can be used as the second tubular body 102. Accordingly, a large-scale pool for soaking the entire fuel cell stack 10 is not required. In other words, it is possible to prevent the submersion test apparatus 100 from becoming large in size.

Further, when the second tubular body 102 is connected to the fuel cell stack 10, the screw holes 22 and 24 formed in the first end plate 18a and the second end plate 18b are utilized. After the second tubular body 102 is removed from the fuel cell stack 10, a predetermined member such as a protective panel is connected to the screw holes 22 and 24. That is, the second tubular body 102 is connected to the fuel cell stack 10 through the screw holes 22 and 24 formed for mounting the predetermined member. Therefore, it is not necessary to separately provide a connecting portion for connecting the second tubular body 102 to the fuel cell stack 10. Therefore, also in the second embodiment, the shape or configuration of the fuel cell stack 10 can be prevented from becoming complicated.

In addition, also in the second embodiment, it is possible to perceive the presence of a leak point regardless of whether the leak point is in the hydrogen gas flow path, the oxygen-containing gas flow path, or the coolant flow path.

In the second embodiment, as shown in FIG. 7, it is also possible to use a third tubular body 120 which is not transparent. The third tubular body 120 is also a container for carrying out a submersion test. In this case, it is preferable that a mounting hole 122 is formed in a ceiling wall of the third tubular body 120, and a bubble generation recognition device 124 is mounted to the mounting hole 122. Suitable examples of the bubble generation recognition device 124 include a camera, a sound collecting microphone, and the like. In this case, the submersion test apparatus 100 includes an analyzing device 66 such as a personal computer.

In the configuration using the camera, for example, the generation of the bubbles B is detected based on a processed image. In the configuration using the sound collecting microphone, the generation of the bubbles B is detected by the sound generated when the bubbles B are generated being collected. In either case, a warning is displayed on the analyzing device 66. If necessary, a warning sound is generated. As a result, the operator can determine that "there is a leak point in the fuel cell stack 10".

In the second embodiment, a liquid other than water may be used.

The present invention is not limited to the above-described embodiments, and various configurations can be adopted therein without departing from the essence and gist of the present invention.

For example, as shown in FIG. 8, a tubular body 130 may be formed of a plurality of members. In FIG. 8, holes such as insertion holes and pipe insertion holes are omitted. The same applies to FIG. 9 described later. The number of members is not particularly limited to two as shown in FIGS. 8 and 9. The number of members may be three, four, or the like.

The tubular body 130 illustrated in FIG. 8 includes a tubular body main part 132 and a closing plate 134. The tubular body main part 132 has a substantially inverse Ω (℧) shape cross-section perpendicular to the longitudinal direction thereof, with an opening on the lower side thereof. The closing plate 134 closes the lower side opening of the tubular body main part 132. The closing plate 134 is connected to the tubular body main part 132. Bolt insertion holes 138 different from the screw insertion holes 50 are formed in the tubular body main part 132 and the closing plate 134. Bolts 136 for connecting the tubular body main part 132 and the closing plate 134 are passed through the bolt insertion holes 138.

A tubular body 148 illustrated in FIG. 9 includes a first L-shaped plate 144 and a second L-shaped plate 146. A first tab portion 140 and a second tab portion 142 are formed on the first L-shaped plate 144 so as to protrude therefrom. The first tab portion 140 and the second tab portion 142 are connected to the second L-shaped plate 146. When the connecting portions between the members are sufficiently sealed, the tubular bodies 130 and 148 may be used as containers for performing an airtight test.

Further, instead of the first end plate 18a and the second end plate 18b, it is also possible to use the insulating plate 16a as the first end constituting member and the insulating plate 16b as the second end constituting member.

What is claimed is:

1. A leak test method for a fuel cell stack for checking whether there is a leak point in the fuel cell stack, the fuel cell stack comprising: a cell stack body formed by stacking a plurality of unit cells together; a first end plate located at one end of the cell stack body in a stacking direction of the unit cells; and a second end plate located at another end of the cell stack body in the stacking direction of the unit cells, the leak test method comprising:
a tubular body mounting step of surrounding the unit cells with a tubular body including a first opening and a second opening at both ends thereof; and
a determination step performed after the tubular body mounting step, wherein
in the tubular body mounting step, by connecting the tubular body to the first end plate and the second end plate, the first opening and the second opening are closed respectively by the first end plate and the second end plate, the tubular body extends from the first end plate to the second end plate, and a gap is formed between outer walls of the unit cells and an inner wall of the tubular body, and
in the determination step, a test gas is supplied to an inside of the fuel cell stack to determine whether the test gas exists in the gap.

2. The leak test method for the fuel cell stack according to claim 1, wherein the gap is formed between upper outer walls of the plurality of unit cells and an uppermost portion of the tubular body.

3. The leak test method for the fuel cell stack according to claim 1, further comprising a vacuum drawing step of vacuuming the gap after the tubular body mounting step, wherein
the determination step is performed after the vacuum drawing step, and
a concentration of the test gas in the gap is measured in the determination step.

4. The leak test method for the fuel cell stack according to claim 1, wherein the determination step is performed while a diffusion device is driven in the gap.

5. The leak test method for the fuel cell stack according to claim 1, further comprising a liquid storing step of storing a liquid in the gap after the tubular body mounting step, wherein
the determination step is performed after the liquid storing step, and
whether generation of a bubble in the liquid is observed is determined in the determination step.

6. The leak test method for the fuel cell stack according to claim 5, wherein at least a part of the tubular body is made transparent.

7. The leak test method for the fuel cell stack according to claim 5, wherein
a bubble generation recognition device is provided inside the tubular body, and
whether the bubble has been generated is determined using the bubble generation recognition device.

8. The leak test method for the fuel cell stack according to claim 1, wherein
each of the first end plate and the second end plate includes a screw hole configured to connect a protective panel, and
in the tubular body mounting step, each of the first end plate and the second end plate is connected to the tubular body via a screw screwed into the screw hole.

* * * * *

UNITED STATES PATENT AND TRADEMARK OFFICE
CERTIFICATE OF CORRECTION

PATENT NO. : 11,777,119 B2
APPLICATION NO. : 17/587067
DATED : October 3, 2023
INVENTOR(S) : Takahiro Tanaka It is certified that error appears in the above-identified patent and that said Letters Patent is hereby corrected as shown below:

On the Title Page

Please delete the Title Page and insert with the attached Title Page showing the corrected number of drawings.

In the Drawings

Please replace drawing sheets 1-5 with replacement drawing sheets 1-9 attached hereto.

Signed and Sealed this
Nineteenth Day of March, 2024

Katherine Kelly Vidal
*Director of the United States Patent and Trademark Office*

(12) United States Patent
Tanaka

(10) Patent No.: US 11,777,119 B2
(45) Date of Patent: Oct. 3, 2023

(54) LEAK TEST METHOD FOR FUEL CELL STACK

(71) Applicant: HONDA MOTOR CO., LTD., Tokyo (JP)

(72) Inventor: Takahiro Tanaka, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/587,067

(22) Filed: Jan. 28, 2022

(65) Prior Publication Data

US 2022/0255098 A1    Aug. 11, 2022

(30) Foreign Application Priority Data

Feb. 8, 2021    (JP) .................... 2021-018045

(51) Int. Cl.
*H01M 8/04*     (2016.01)
*H01M 8/04664*  (2016.01)
*H01M 8/04089*  (2016.01)
*H01M 8/2475*   (2016.01)
*G01M 3/22*     (2006.01)
*H01M 8/0432*   (2016.01)

(52) U.S. Cl.
CPC ....... *H01M 8/04679* (2013.01); *G01M 3/226* (2013.01); *H01M 8/04089* (2013.01); *H01M 8/04358* (2013.01); *H01M 8/2475* (2013.01)

(58) Field of Classification Search
CPC ......... H01M 8/04679; H01M 8/04089; H01M 8/04358; H01M 8/2475
See application file for complete search history.

(56) References Cited

U.S. PATENT DOCUMENTS

2014/0080029 A1*  3/2014  Hori .................... H01M 8/0204
                                                      429/465

FOREIGN PATENT DOCUMENTS

JP    2006-156038 A    6/2006
JP    2010-049952 A    3/2010

* cited by examiner

*Primary Examiner* — Olatunji A Godo
(74) *Attorney, Agent, or Firm* — Carrier, Shende & Associates P.C.; Joseph P. Carrier; Jeffrey T. Gedeon

(57) ABSTRACT

In a tubular body mounting step, a tubular body is connected to a first end constituting member and a second end constituting member of a fuel cell stack, respectively. At this time, a first opening and a second opening formed at both ends of the tubular body are closed by the first end constituting member and the second end constituting member, respectively. Accordingly, the fuel cell stack is surrounded by the tubular body. A gap is formed between the outer wall of unit cells of the fuel cell stack and the inner wall of the tubular body. In a determination step, a test gas is supplied into the fuel cell stack. Further, whether the test gas exists in the gap is determined.

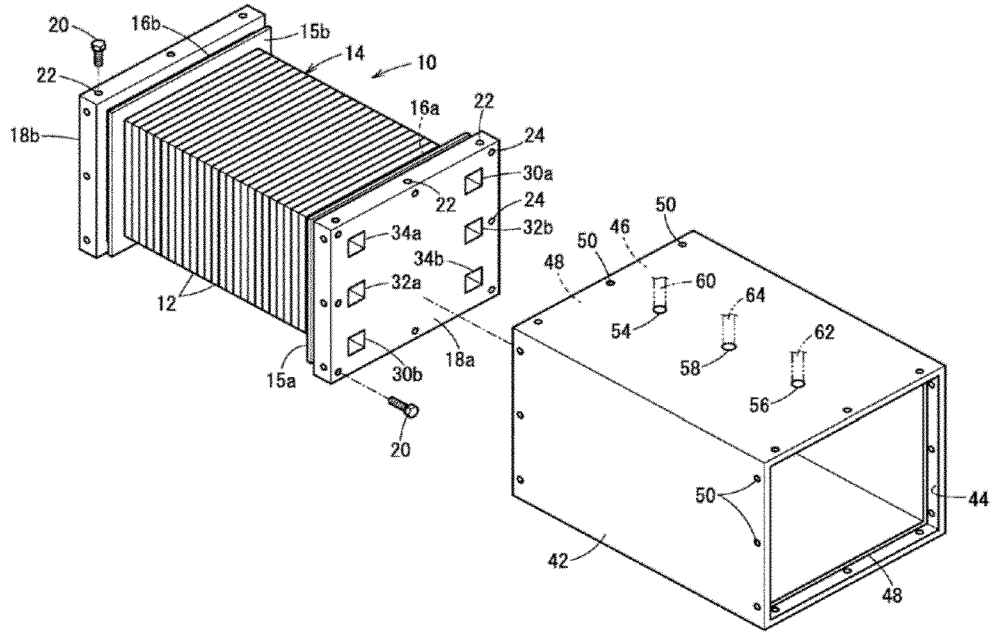

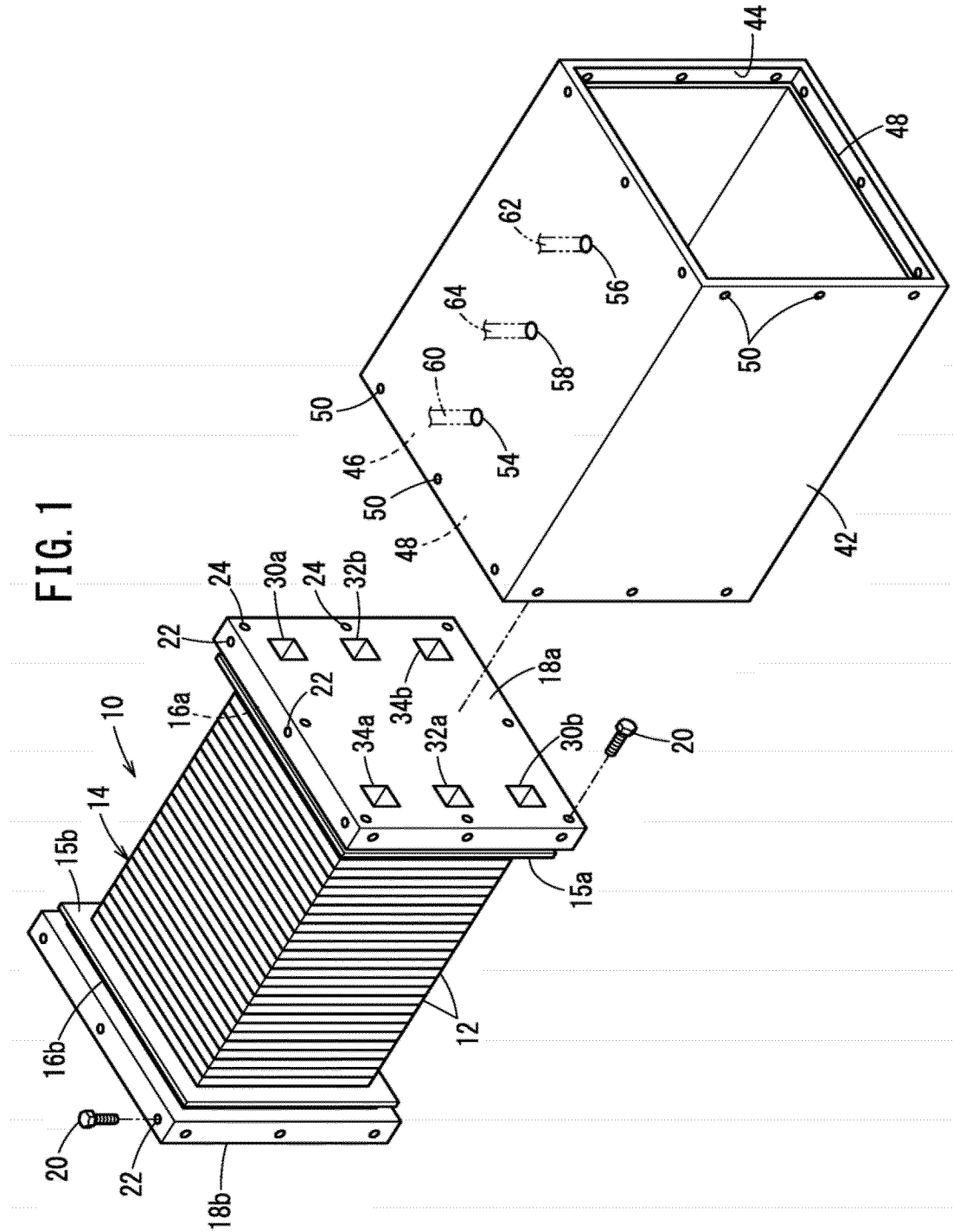

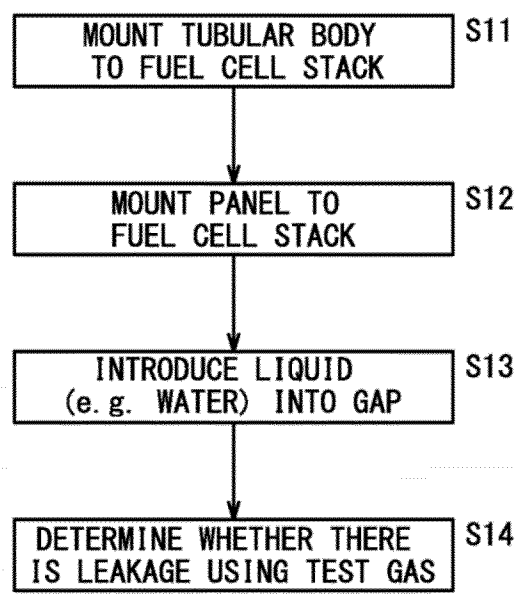

8 Claims, 9 Drawing Sheets